Jan. 21, 1969    J. P. CHERNOCH ET AL    3,423,691
DISK LASER HAVING PUMPING MEANS IN INDIRECT OPTICAL
COMMUNICATION WITH THE DISK END FACES
Filed Sept. 25, 1963    Sheet 1 of 4

INVENTORS
JOSEPH P. CHERNOCH,
HAROLD R. KOENIG by Paul A. Frank
His Attorney.

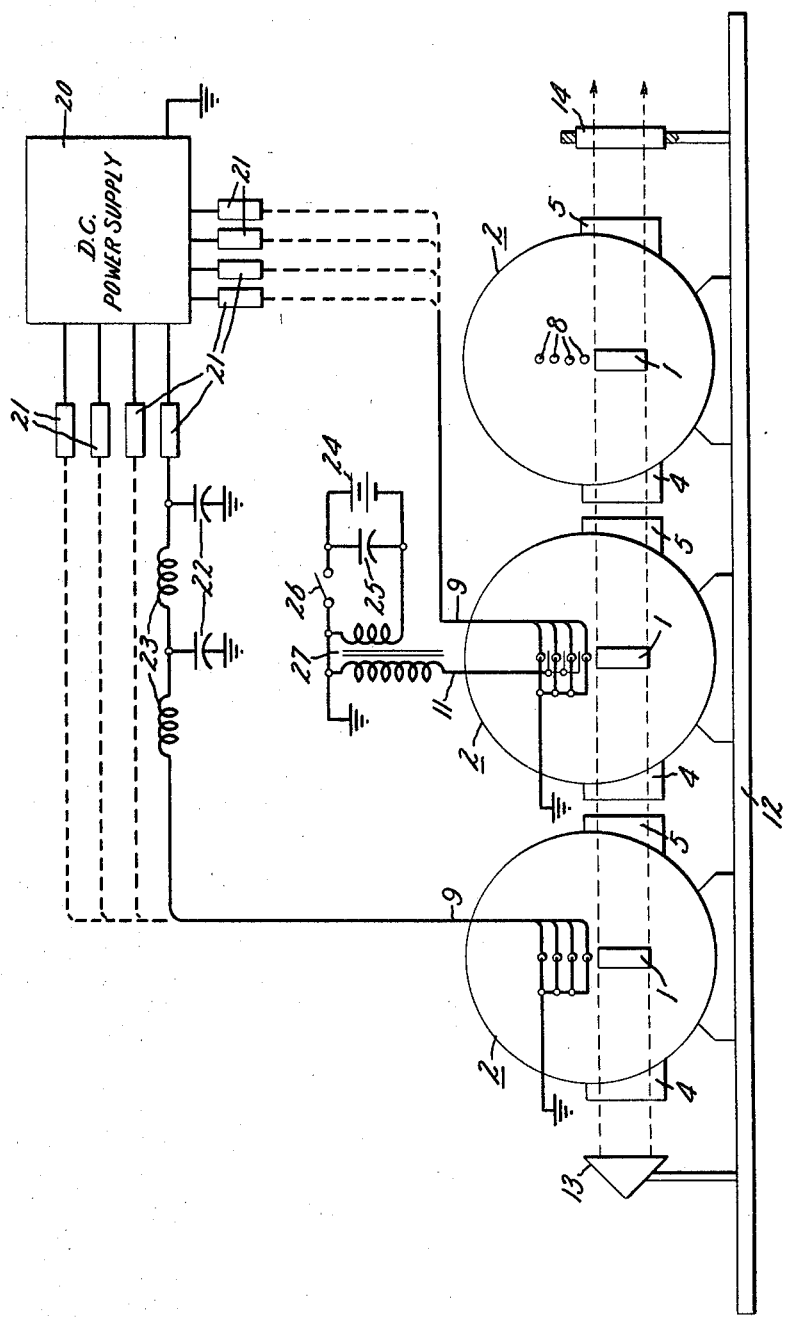

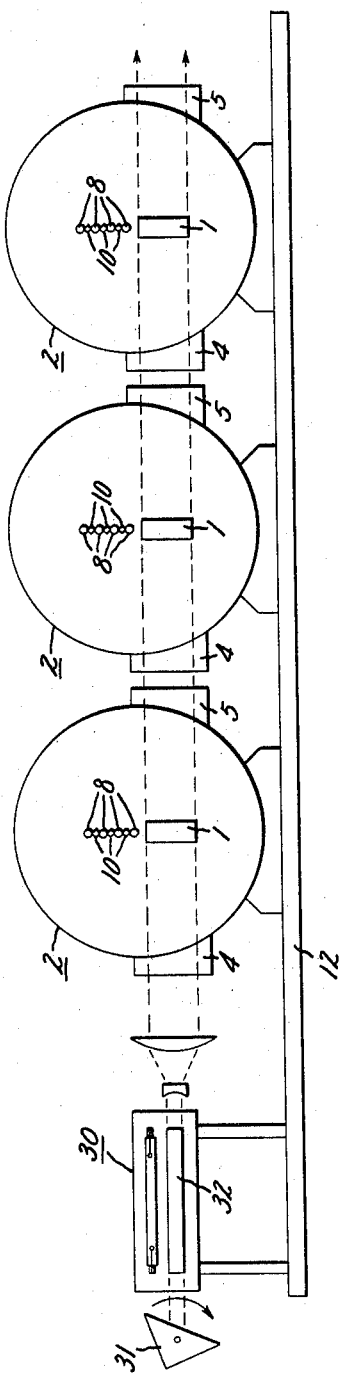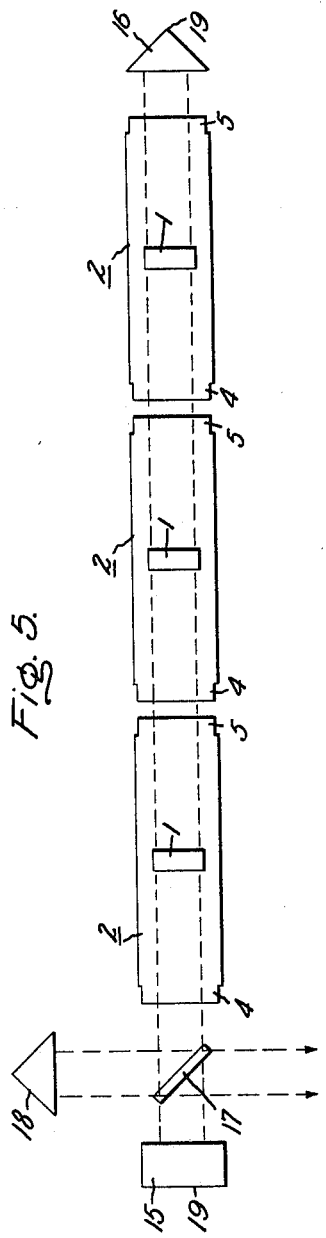
INVENTORS
JOSEPH P. CHERNOCH,
HAROLD R. KOENIG

United States Patent Office

3,423,691
Patented Jan. 21, 1969

3,423,691
DISK LASER HAVING PUMPING MEANS
IN INDIRECT OPTICAL COMMUNICATION
WITH THE DISK END FACES
Joseph P. Chernoch and Harold R. Koenig, Schenectady, N.Y., assignors to General Electric Company, a corporation of New York
Continuation-in-part of application Ser. No. 306,424, Sept. 4, 1963. This application Sept. 25, 1963, Ser. No. 311,517
U.S. Cl. 331—94.5    5 Claims
Int. Cl. H01s 3/02

ABSTRACT OF THE DISCLOSURE

A disk-shaped body of laser material is optically pumped solely through its large end faces and the resultant laser radiation is also emitted from such end faces. The body of laser material is enclosed in a housing having a reflective inner surface. Pumping lamps supported within the housing are in indirect optical communication with the laser disk end faces for optically pumping the laser material through such end faces upon one or more reflections from the housing inner surface.

---

Our invention relates to a laser apparatus for generating a beam of electromagnetic energy, and in particular, to a disk-shaped laser device which is excited into a metastable high energy state by indirect optical pumping of the end faces thereof. This application is a continuation-in-part of copending application Serial No. 306,424, filed September 4, 1963, now abandoned, and assigned to the same assignee as the present invention.

A recently developed device, now conventionally described as a laser (light amplification by stimulated emission of radiation), has the potential for wide application in many diverse fields such as communication, metallurgy, and medicine. The laser is a light source having the radiated output therefrom predominantly in one or more narrow bands of the electromagnetic spectrum. Such output is a narrowly diverging beam of light which is in the visible or near visible frequency range of the electromagnetic spectrum.

Although specific liquids and gases have been found to exhibit the properties of the laser, the solid laser material in rod form has provided the highest energy output, this output being generally defined in joules. The laser rod releases electromagnetic energy stored in discrete metastable states as a result of being excited by an electromagnetic signal of the correct frequency. Thus, a light source of the constant or flash operating type may be employed to excite or optically pump a laser rod into a metastable high energy state whereupon a stimulated emission of monochromatic and directional (coherent) electromagnetic radiation is effected from the ends of the laser rod. The laser rod is preferably optically pumped along the sides thereof and the energy emitted by the laser is directly proportional to the volume of laser material. The effectiveness of the pumping is directly proportional to the surface area available for absorption of the optical pumping energy. From such consideration, it follows that the energy output of such rod is determined primarily by the geometry and size of the rod, the type of laser material, and the amount of optical pumping energy absorbed by the rod. The practical problem of producing large and long pieces of optically perfect laser material and the mechanical and thermal problems inherent in operating with such large masses of material present the disadvantage that a limit may be reached beyond which an increase in the size of the present rod type laser is impossible.

Therefore, one of the principal objects of our invention is to develop a laser device having an improved configuration of the laser material.

The conventional rod type laser apparatus comprises a more or less cylindrical housing having a reflective inner surface and a laser rod and optical pumping lamp supported therein with the longitudinal axis of the housing, rod, and lamp being parallel. The laser rod is optically pumped both directly from the lamp and indirectly by reflection from the housing reflective surface.

Another important object of our invention is to develop a laser device having a new configuration of the laser material with respect to the housing and lamp whereby the laser material is wholly indirectly optically pumped.

The conventional laser device comprises a single housing containing the aforementioned laser rod and lamp therein. Such device may be operated on a pulsed or continuous basis as determined by the optical pumping means employed. The maximum energy or power output of this device is relatively low.

A still further object of my invention is to develop a serial arrangement of laser modules wherein the outputs of the modules are additive and generate a single beam of electromagnetic energy in a continuous or pulse operating mode as determined by the optical pumping means employed. The pulsed mode provides a beam having an extremely high energy and the continuously operating mode provides a beam having a relatively high power.

Briefly stated, and in accordance with our invention in meeting the objects enumerated above, we provide a laser device in which the laser material configuration comprises a relatively short cylindrical body having relatively large end surfaces, that is, of disk shape. The laser disk is supported within a housing having a reflective inner surface. The housing may be of spherical shape; alternatively, it may have a configuration similar to that of, but larger than, the laser disk material, in which case the longitudinal axes of the disk and housing are perpendicular with respect to each other. A planar array of lamps of the flash or constant output type is supported within the housing. The lamps are arranged in closely spaced-apart parallel relationship with respect to each other in order to generate an intense planar front of electromagnetic radiation upon being energized. The plane of the lamps passes through the body of laser material and parallel to the end faces thereof whereby the lamps are in indirect optical communication with such end faces. An optical resonant cavity is formed by positioning two reflective members, aligned with each other, external of the housing whereby the laser disk is interposed therebetween. Since the end faces of the laser disk have a relatively large area, a high energy or relatively high power laser beam may be generated upon energization of the lamps.

The housing, laser disk, and plurality of lamps hereinabove described form what will hereinafter be described as a laser module. Apertures are provided in each housing in alignment with the end faces of the laser disk. A plurality of laser modules may be mounted in a serial arrangement in an optical resonant cavity wherein the apertures are aligned with respect to each other. Simultaneous energization of the lamps contained within each module effects simultaneous optical pumping of the laser disks and thereby generates a laser beam which is emitted from the aperture of the housing comprising the final member of the series of modules. Such laser beam may have an extremely high energy when the laser disk is operated in the pulsed mode.

The features of my invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein:

FIGURE 4 is a diagrammatic side view of a serial arrangement of laser modules forming a first embodiment of a high energy laser oscillator;

FIGURE 5 is a diagrammatic top view of a second embodiment of a high energy laser oscillator; and FIGURE 6 is a diagrammatic side view of a third embodiment of a high energy laser oscillator.

Figure 1:
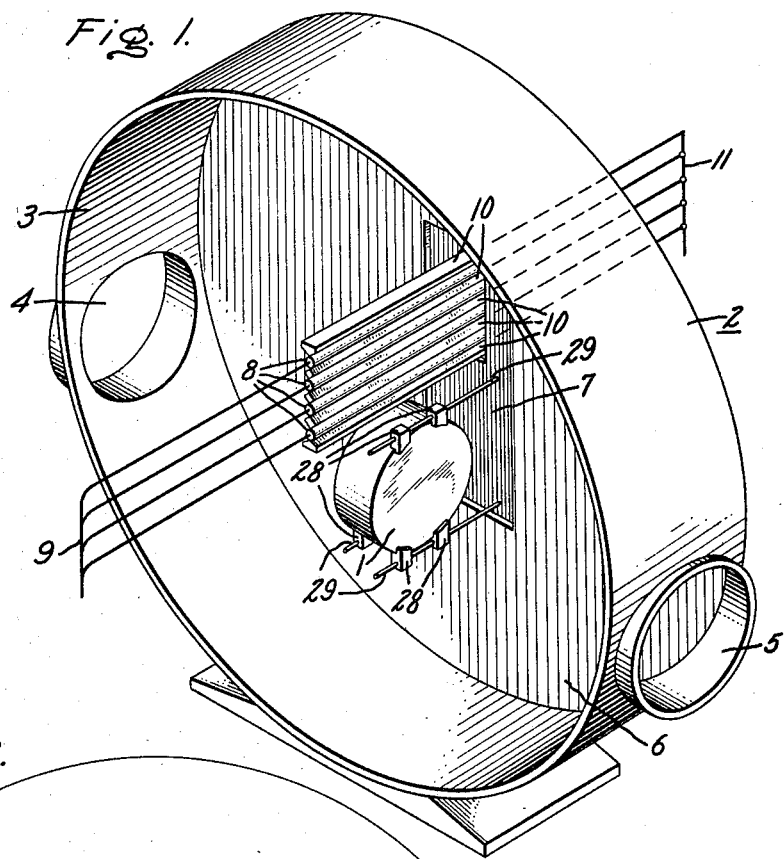
FIGURE 1 illustrates a perspective view of a first embodiment of a laser module constructed in accordance with our invention.

Laser operation depends upon the fact that all atomic and molecular systems possess discrete quantum energy states; that is, they store energy in fixed amounts or quanta. These characteristic energy states are different for each element or system. The basic requirement for laser action is a material containing selected atoms whose electrons can be excited from the quantum ground state into a suitable metastable higher energy state. An electromagnetic signal of the correct frequency interacts with these atoms, that is, excites or optically pumps their electrons into such metastable higher energy state. The transition of the electrons from their lowest energy state to the metastable higher energy state is almost immediately followed by a transition back to a metastable lower energy state and then to the original stable ground energy state or terminal state. This transition to the terminal state is accompanied by what is generally described as an initial spontaneous emission of electromagnetic radiation. A suitable optical resonant cavity amplifies such initial spontaneous radiation and generates a stimulated emission of electromagnetic radiation from the laser material. This stimulated emission of radiation may be in the visible region of the electromagnetic energy spectrum or in the near visible range such as the infrared or ultraviolet. The particular emitted radiation is characteristic of the laser material being employed. The output energy of the emitted laser radiation is determined primarily by the geometry and size of the laser material and the optical pumping energy. The directionality of the emitted laser radiation is determined primarily by the geometry of the laser material and the optical resonant cavity.

The conventional geometry of laser material is a long rod generally cylindrical in shape and circular in cross section. The two ends of the rod are coated with a suitable material to form an optical resonant cavity therebetween. The optical pumping device is a helical lamp disposed about the laser rod, or, in the alternative, a straight lamp positioned parallel to the rod. The lamp is of the flash type for pulsed laser operation and of the constant light output type for the continuously operating laser. The laser rod and lamp are contained within a housing also generally cylindrical in shape and having a highly reflective inner surface and a longitudinal axis parallel to the longitudinal axis of the laser rod. The lamp, upon energization, optically pumps the laser rod through the side surfaces thereof. The rod is pumped predominantly indirectly by reflection from the housing reflective surface and to a lesser degree, directly from the lamp. The output energy of the radiation emitted by the laser is determined by the energy density and area of the end faces of the laser rod. Higher outputs of laser energy are obtained by increasing the pumping energy and the length and cross-sectional area of the laser rod.

However, a limit is reached beyond which an increase in the size of the present rod type laser does not generate a useful increase in laser output energy. The limit is determined by several factors. Firstly, the activated portion of the laser material is determined by the depth to which the pumping energy can penetrate. Thus, in increasing the cross-sectional area of the laser rod beyond a particular size, the output of laser energy no longer increases as the volume of laser material but only as the diameter since the laser material within the innermost part of the rod does not become excited into the desired metastable higher energy state. Further, the laser beam generated thereby has a hollow configuration due to the unexcited part of the rod. Secondly, increasing the length of the laser rod to produce a greater surface in optical communication with the flash lamp and a larger volume of excited material and thereby generate a higher level of laser energy density, beyond a certain dimension, presents the practical problem of producing long pieces of optically perfect laser material and the mechanical and thermal problems inherent in operating with such configuration. Thirdly, destruction of the laser material occurs when the laser energy density reaches a sufficiently high level. Fourthly, a spontaneous avalanche condition occurs when the gain length factor of the laser rod exceeds a certain value thereby precluding a high degree of directivity in the beam of laser radiation. Non-uniform temperature within the laser medium during optical pumping, as a function of the laser rod radius, also causes optical path distortion. The non-uniform temperature is caused by non-uniform pump flux penetration into the laser rod.

Our invention overcomes the above-mentioned problems by utilizing a novel means for indirectly optically pumping a body of laser material which has a configuration especially suitable for generating high outputs of laser energy. Referring particularly to FIGURE 1, we employ a relatively short cylindrical body of laser material 1 having relatively large end surfaces or faces. We define a "relatively short" body having "relatively large" end surfaces as one in which a diameter dimension exceeds the longitudinal dimension. As herein employed, "cylindrical" is defined as the surface traced by any straight line moving parallel to a fixed straight line. Thus, the cross section of the laser body may be circular as illustrated, or any other suitable shape as desired. The geometry is preferably such that the diameter of the laser body is considerably greater than the length thereof and thereby forms a disk-like member. Laser disk 1 is supported within a housing 2 which may be made of metal and is of the same general configuration as laser disk 1 and has a highly reflective inner surface. The laser disk is positioned within housing 2 in a manner whereby the longitudinal axes are perpendicular to each other. Thus, the longitudinal or optical axis of laser disk 1 is directed toward curved surface 3 of housing 2 and is aligned with apertures 4 and 5 which are formed within such curved surface and are of size slightly greater than the end faces of laser disk 1. Disk 1 may be supported within housing 2 by any suitable means such as, for example, two pairs of clamps 28 disposed adjacent each end face of disk 1, each such pair being attached to a rod member 29 which passes through a removable panel 7 located in each end wall 6 of housing 2. As another example, each two pairs of clamps 28 may be replaced by a ring-shaped retaining member encircling a cylindrical end of disk 1. Housing 2 comprises side wall 3, which is shown as being cylindrical in form but may also be elliptical in cross section, enclosed on both ends by parallel planar end walls 6. Housing 2 may thus be visualized as a hollow right cylinder which is sectioned to a short length by a pair of planar end surfaces. An alternative form for housing 2 comprises a complete hollow sphere or a hollow sphere which is sectioned to a short length by a pair of parallel planar end surfaces which are equally spaced from a plane passing through the center of the sphere.

An optical pumping means for the laser disk employs a plurality of lamps 8 disposed adjacent each other in a parallel arrangement to form a plane passing substantially through the center of laser disk 1 and perpendicular to the longitudinal axis thereof. The lamps are of a type having a radiation output preferably in a narrow and desired spectral range to concentrate such lamp radiation in the particlular spectral area required to optically pump the laser material. Such lamps may be of the constant or flash operating type to obtain respectively a continuously operating or pulsed mode of laser operation. In FIGURE 1, the array of lamps is positioned perpendicular to the end walls 6 of housing 2. The lamps are supported within housing 2 by having their terminal ends brought out through the two removable panels 7 located in end walls 6. A suitable source of electrical energy (shown in FIGURE 4) adapted for energization of flash lamps is connected to first terminal ends of the lamps by means of conductive wires 9. Such first terminal ends are electrically insulated from their associated supporting panel 7. The second terminal ends are maintained at the ground potential of housing 2. Adjacent lamps are separated by means of reflector members 10, which have substantially square cross sections, and are oriented for directing the lamps' radiation toward particular areas of the highly reflective inner surface of housing 2 thence to one or both of the end faces of disk 1. In the case of flash lamps, they may be sufficiently energized by providing electrical energy of sufficiently high voltage across their terminals, however, it is preferable to employ an external electronic trigger to initiate the gaseous discharge within the flash lamps. In such case, reflectors 10 serve the dual purpose of directing the radiation output from the lamps toward particular areas of the housing surface and also function as trigger electrodes for initiating such gaseous discharge. The reflector members each comprise an intermediate section of highly polished electrically conductive material such as aluminum and terminal ends of electrically insulating material. Reflectors 10 may also be supported within housing 2 by having their insulated terminal ends brought out through removable panels 7 in end walls 6. A relatively high voltage energizing circuit (shown in FIGURE 4) is connected to a conductive wire 11 which passes through first insulated ends of the reflective trigger electrodes. The two outermost lamps are preferably each provided with a second reflector member disposed at opposite edges of the lamp array to further aid in directing the outer lamps' radiant output toward one or both (as illustrated) of the end faces of laser disk 1. In the case of a continuously operating laser, reflector members 10, in general, function merely as light reflecting members. Although the laser module is operable without reflector members 10, their presence permits a more efficient optical pumping of the laser disk and also shields the lamps from direct radiation by adjacent lamps thereby prolonging lamp life.

Figure 2:
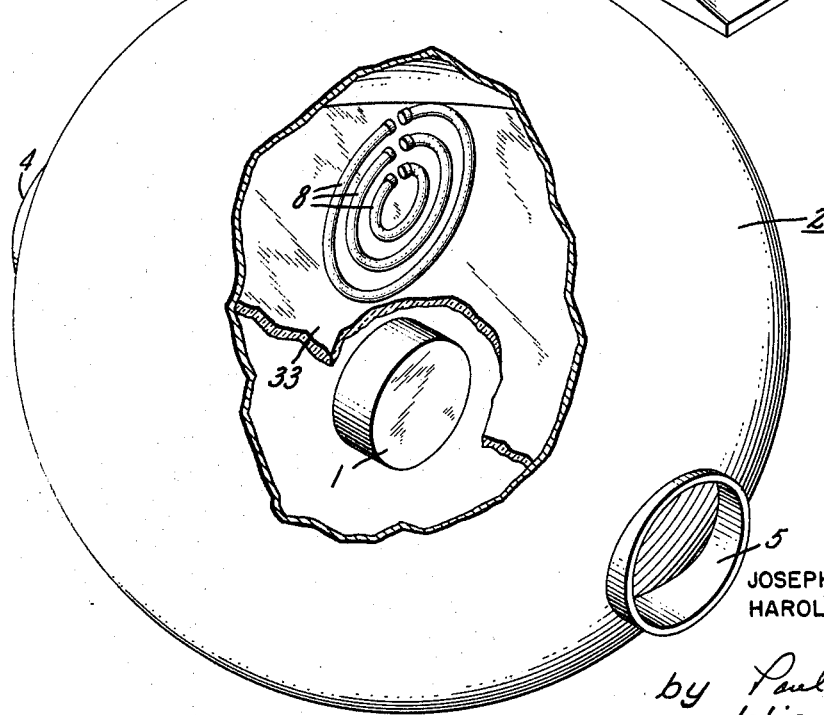
FIGURE 2 is a fragmentary view of a second embodiment of a laser module.

The lamp-reflector plane or array and laser disk are positioned in separate portions of the housing cavity and are approximately equally spaced from the center of housing 2 to obtain a high efficiency of transmission of the pumping radiation from the lamps to the end faces of laser disk 1. The lamp-reflector plane and laser disk are preferably located at the conjugate focii of the ellipse for a housing 2 configuration having an elliptical shape in cross section. Since the lamp-reflector array develops an intense planar front of radiation, a suitable selective radiation filter may be provided between the lamp-reflector plane and laser disk (as illustrated in FIGURE 2) to reduce the heating of the laser disk. Alternatively, or in addition, cooling means such as forced air or liquid coolants may be employed. The cooling means is most effective when applied to lamps 8 and may comprise suitable water jackets. A controlled atmosphere may also be provided within housing 2 to minimize absorption by such atmosphere of the intense pump and laser output radiation. Such atmosphere may be provided solely in the disk portion of housing 2 or may completely fill the housing. This atmosphere should be a homogeneous media, i.e., provide a constant index of refraction. The atmosphere may be any of a number of suitable gases such as nitrogen. A vacuum may also be employed in the disk portion of the housing in which case cooling means should be provided in the lamp portion of the housing.

The lamp-reflector array thus provides an intense light source having an output characterized by one or two planar fronts of light which are reflected once or several times from both the curved surface 3 and planar surfaces 6 of housing 2 and thence directed respectively into one or both of the end faces of disk laser 1, that is, lamps 8 are in indirect optical communication with the end faces of laser disk 1.

The combination of the laser disk, lamps, reflector, and housing hereinabove described forms what may be defined as a laser module. A specific example of a laser module which generates a pulsed laser beam having a maximum energy level in the order of 1,000 joules comprises the following elements. Housing 2 has a circular cross section 30 inches in diameter and a depth of 7 inches between end walls 6. The inner surface of side wall 3 comprises polished aluminum and the inner surface of end walls 6 is a silvered glass mirror. It can be appreciated that side wall 3 can also comprise a mirror and thereby further increase the reflectivity within housing 2. Laser disk 1 comprises neodymium glass measuring six inches in diameter by two inches in thickness. The composition of such laser material comprises a one percent neodymium doped lanthanum borate glass. Five conventional straight xenon flash lamps and six associated reflective trigger electrodes are employed in an array of the type shown in FIGURE 1. The total energy input to such lamps is in the order of 50,000 joules. It should be understood that at the present time, rapid advances are being made in the laser field, and the resultant higher efficiency of future lasers will decrease such required energy input by at least one order of magnitude. The end faces of laser disk 1 are flat, polished, and coated with a low reflection coating for the particular laser wave length while the cylindrical side surfaces are left unpolished. The end faces are not necessarily optically flat, the criterion being that the optical transmission through the laser material is uniform. The power supply for the flash lamps provides approximately 4,000 volts to the lamp terminals. The trigger electrode voltage is approximately 20,000 to 25,000 volts. The laser beam generated by laser disk 1 and emitted through apertures 4 and 5 is a highly collimated and coherent electromagnetic radiation having a wave length of 1.06 microns which is in the invisible infrared spectrum. It is to be understood that the laser module is contained within an external optical resonant cavity which may be formed, for example, by two reflective members aligned with each other, such as members 13, 14 in FIGURE 3.

FIGURE 2 is a fragmentary view of a second embodiment of a laser module illustrating a lamp array comprising lamps of curved or circular configuration. Housing 2 is a complete sphere in this particular embodiment, although it is to be understood that a sphere may also be employed in the other embodiments herein described. Alternatively, the housing of the second embodiment may be of the configuration described with relation to FIGURE 1. The curved lamps 8 and corresponding curved reflector members (not shown) are arranged in spaced-apart, parallel relationship within a plane passing substantially through the center of laser disk 1 and perpendicular to the longitudinal axis thereof in the same manner as the embodiment of FIGURE 1. The particular use of curved lamps illustrates a preferred configuration of the lamp array relative to the end faces of the laser disk whereby the respective geometries are matched and a higher efficiency of optical pumping is thereby attained. Curved lamps could also obviously be employed in the other embodiments herein described. The laser pumping pattern produced by the embodiment illustrated in FIGURES 1 and 2 is substantially the same, that is, a planar front of substantially uniform and intense electromagnetic radiation or pumping energy is produced which indirectly optically pumps one or both of the end faces of laser disk 1. However, with spherical housing 2 only one reflection of the pumping energy need take place between the lamp array and laser disk. A suitable selective glass filter 33 divides housing 2 into two parts and filters out the spectrum of the lamp radiation which is not useful for pumping the laser disk. Such filter permits cooler operation of the laser disk. Since the lamp-reflector array illustrated in FIGURE 2 is of different configuration from that in FIGURE 1, another suitable means (not shown) must be employed to support such array within housing 2.

Figure 3:
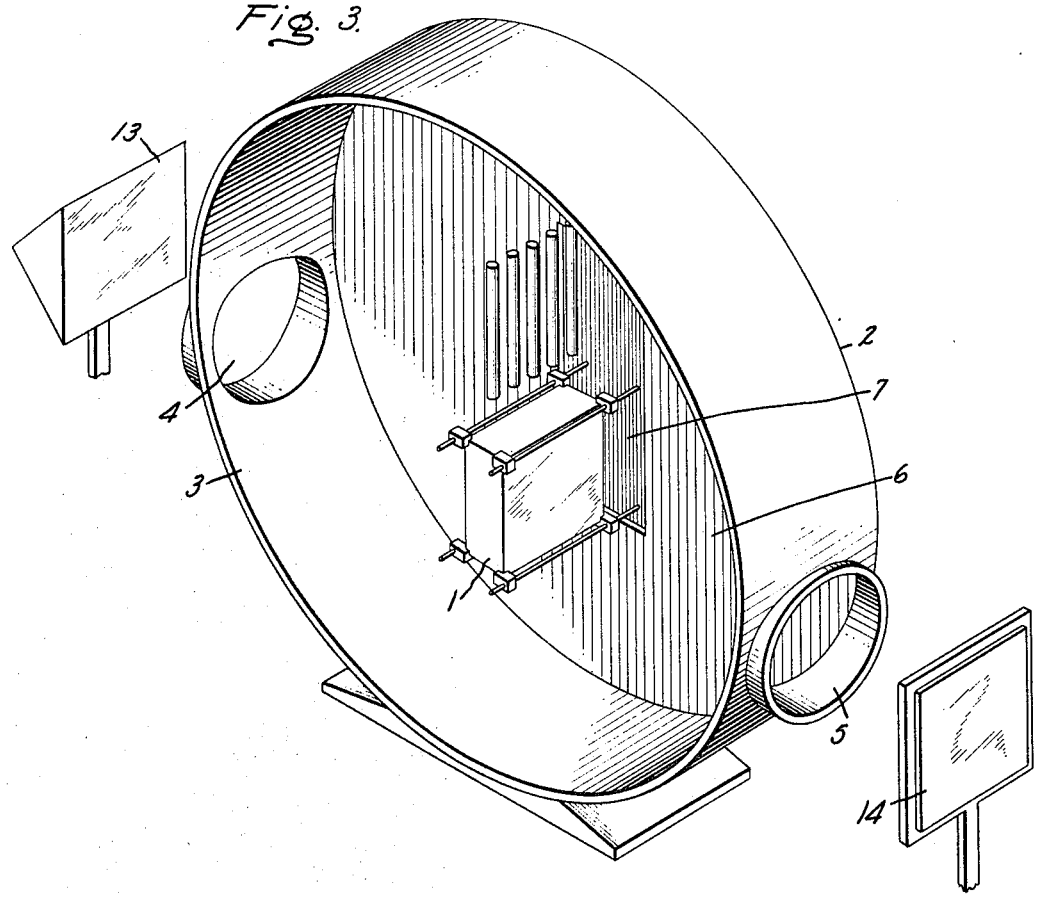
FIGURE 3 is a perspective view of a third embodiment of a laser module.

FIGURE 3 illustrates a third embodiment of a laser module comprising a lamp array similar to that illustrated in FIGURE 1 but having the lamps 8 and reflector members (not shown) disposed parallel to end walls 6 rather than perpendicular thereto as in FIGURE 1. Laser disk 1 is of generally square or rectangular cross section in this embodiment as distinguished from the circular configuration in FIGURES 1 and 2. The plane of the lamp-reflector array passes substantially through the center of laser disk 1 and perpendicular to the longitudinal axis thereof in the same manner as the embodiments of FIGURES 1 and 2. Since the lamp-reflector array illustrated in FIGURE 3 is disposed in a different relationship from that in FIGURE 1, another suitable means (not shown) must be employed to support such array within housing 2. As one example, such support comprises two horizontal hollow rod members and associated interconnections disposed along opposite ends of the lamps in the array and passing through the two removable panels 7 located in end walls 6. The conductive wires supplying the electrical energy to the flash lamps may be contained within a first of the hollow rod members, and the wire supplying the trigger electrode voltage contained within the second member for the case of pulsed laser operation. As another example, a support for both the laser disk and lamp-reflector array may comprise four vertical rod members and associated interconnections wherein the rod members pass through housing 2 substantially centrally thereof.

Of the three embodiments hereinabove described, the FIGURE 1 embodiment is the most easily fabricated. However, the FIGURE 2 embodiment is the most efficient optically since the optical pumping energy need undergo only one reflection from the inner surface of spherical housing 2. An increasingly larger diameter spherical housing, relative to the laser disk, has the advantage of reducing aberration. The FIGURE 2 spherical housing embodiment would have substantially the same high optical efficiency with other matched configurations of lamp array and laser disk, that is, both may be of square shape, or other shapes as desired.

The large area of the end faces provided by the disk-shaped laser, in addition to providing an efficient pumping geometry, permits the generation of a high output of laser energy while maintaining the energy or power density within the laser material below the destructive level. The laser modules hereinabove described can be combined into system components such as a high energy laser oscillator or power amplifier. FIGURE 4 illustrates a first embodiment of a high energy laser oscillator comprising a plurality of laser modules wherein each module is optically coupled with the adjoining modules. Thus, the modules are rigidly supported on a base member 12 conventionally known as an optical bench and apertures 4 and 5 of each module are aligned with respect to each other whereby laser disks 1 are also in alignment. The modules are spaced apart sufficiently to minimize the spontaneous avalanche effects which are inherent in the long rod type lasers. A high energy oscillator configuration is obtained by arranging the laser modules in series with external optical reflectors at either end. The external reflectors define an optical resonant cavity and are the only elements requiring critical alignment. The interposed laser disks being flat plates cannot distort the plane standing-wave pattern in the cavity if misaligned. Thus, the laser disks need not be aligned with respect to the cavity, and in some applications may be deliberately nonaligned. The external reflectors shown in FIGURE 4 consist of a totally reflective prism such as a conventionally known 90° roof or Porro prism 13 at one end and a partially transmitting dielectric coated plane mirror 14 at the other end. In this arrangement, the Porro prism directs the collimated laser beam toward the plane mirror end and the laser beam passes from the latter end outwardly as indicated by the arrows.

At high pumping levels and without additional spatial mode selecting devices, the assembly illustrated in FIGURE 4 may sustain a number of off-axis divergent modes. The off-axis modes can be minimized by widely spacing the cavity reflectors 13, 14. A second high energy oscillator configuration illustrated in FIGURE 5 offers a higher degree of spatial mode selection than that of FIGURE 4. FIGURE 5 is a top view of a laser cavity arrangement employing cylindrical housings such as illustrated in FIGURES 1 and 3. In this second embodiment, the laser cavity is formed by crossed Porro prisms 15 and 16, that is, two 90 degree roof prisms which have been rotated about the laser disk optical axis at an angle of 90 degrees with respect to each other. The laser energy is extracted from the laser cavity by means of a partially reflective mirror 17 which is angularly disposed with respect to the laser disk optical axis. Mirror 17, conventionally described as a beam splitter, is positioned between one of the end laser modules and the adjacent roof prism. Such arrangement permits the lased beam to be emitted in two directions angularly disposed with respect to the laser disk optical axis. A third roof prism 18 may be employed to direct the laser beam in only one of such two directions as indicated by the arrows. The improvement in mode selection, that is, beam collimation, is achieved by rotating roof prisms 15, 16 about the axis defined by the roof edge 19. The angle of rotation is adjusted so that the on-axis mode falls within the critical angle of the total internal reflective surfaces formed by the prism. The off-axis modes which cause the beam divergence thus fall outside the critical angle and instead of being reflected pass directly through the prism. A high degree of spatial mode selectivity is thus achieved and a laser beam divergence of less than 1 minute of arc is maintained. The crossed Porro cavity has a further advantage in that the cavity is self-aligning and does not require critical alignment of the Porro prisms. Also, this cavity being formed by total internal reflecting surfaces sustains a higher laser radiation density than conventional multi-layer dielectric mirrors.

A third embodiment of a high energy laser oscillator utilizes a plurality of laser modules whose sole function is that of power amplification. FIGURE 6 illustrates this arrangement wherein the laser modules are not contained within what has been hereinabove described as an optical resonant or laser cavity, that is, the modules are not enclosed by external reflectors at either end. In FIGURE 6 the laser modules are used to amplify the output of a relatively low output energy laser oscillator 30 which may comprise any well-known configuration such as the Q-switch type wherein a rotatable prism 31 is aligned with one end of a laser rod 32 and is rotated to produce intervals of reflection and nonreflection of the laser beam being generated by the laser rod. Low energy laser oscillator 30 provides a beam of minimum divergence since the relatively low output permits use of spatial mode selecting components, such as a limiting aperture positioned at the common focal point of two spaced-apart positive lenses, that would not be suitable for use at high energy levels. The divergence of the laser beam is further reduced by magnifying the beam and thereby completely filling the end faces of the laser disks in each of the amplifier modules. Beam divergence of the order of seconds of arc is attained with this configuration. The efficiency of the oscillator power amplifier configuration shown in FIGURE 6 may be improved by several means. Thus, to fully extract the energy stored in the laser disks, the disk amplifiers should be driven to saturation. This can be accomplished by increasing the number of modules in series whereby the modules at the beam emitting end are driven to saturation, or by providing an optical regenerative feedback system which is isolated from the low energy laser oscillator.

The constant output lamps 8 in the continuously operating embodiment of my laser device are connected to a direct current power supply of suitable voltage. Such supply may be of conventional design. For the pulsed operating laser the terminals of the flash lamps 8 in each of the laser modules are connected to a conventional capacitor discharge direct current power supply circuit which is illustrated in schematic form in FIGURE 4. Direct current power supply 20 is adapted to be adjustable in an operating voltage range 0 to 5,000 volts for example. The power supply may have internal current limiting control, or external current limiting resistors 21 may be provided in the electrical circuit which connects each flash lamp to the power supply. A capacitor discharge circuit comprising capacitors 22 and small current limiting inductances 23 control the amount and duration of electrical energy supplied to each flash lamp. Trigger electrodes 10 when electrically energized provide uniform ionization of the gas contained within the flash lamps and thereby activate or optically pump each associated laser disk uniformly along its end faces. Electrodes 10 are connected to a relatively high voltage energizing circuit comprising battery 24, capacitor 25, switch 26, and stepup transformer 27. Thus, each closure of switch 26 develops a pulse of voltage in the order of 20,000 to 25,000 volts across the output terminals of transformer 27. The voltage across transformer 27 effects ionization of the gas within the flash lamps thereby rendering the gas conductive and providing a discharge path for the energy stored in capacitors 22. The discharge of capacitors 22 through inductances 23 generates a pulse of electrical energy which is impressed across the flash lamps and thereby produces a pulse of intense light therein. The flash lamps thereby optically pump the end faces of the laser disk which thence generates a pulsed collimated beam of coherent light emitting from such end faces. For purposes of simplified illustration, not all of the electrical conductor connections have been shown in FIGURE 4. It should be understood that the flash lamps and trigger electrodes in each laser module are connected to sources of electrical energy. In the most general case, a single power supply 20 and capacitor discharge circuits equal in number to the flash lamps are utilized, and the trigger electrodes are simultaneously energized.

From the foregoing description, it can be appreciated that our invention makes available a new laser apparatus which employs a relatively short cylindrical body of laser material having relatively large end faces, and such end faces are optically pumped by indirect means from a planar array of flash lamps. Essentially uniform pump flux and high optical coupling efficiency are obtained with this arrangement. The disk laser permits generation of a high energy beam of electromagnetic radiation, especially when operable in the pulsed mode. A laser module comprising a laser disk two inches thick and six inches in diameter is capable of emitting a laser beam having an energy output of 1,000 joules. This energy level is substantially increased by forming a serial arrangement of optically coupled laser modules. Thus, a series of ten such modules provides a beam having an energy of 10,000 joules. Since the energy output of a laser device is directly proportional to the volume of laser material, and a disk-shaped laser having an end face diameter of several feet may readily be manufactured, it is apparent that a much greater volume of laser material may be optically pumped and thereby provide an extremely high level of laser energy in the form of a narrowly diverging beam of electromagnetic radiation. The laser disk is thus not volume limited as in the case of the long rod type laser. Further, the laser disk geometry relaxes the requirements on laser material homogeneity in that local variations in refractive index can be compensated by further polishing of the deformed surface. Finally, temperature distribution and density of the metastable states are considerably more uniform as a function of radius in the disk type laser device as compared to the rod type laser. Variations in both temperature distribution and density of the metastable states do vary in the longitudinal direction for the disk laser but such variations do not degrade the optical phase front along the diameter of the disk.

Having described three particular embodiments of a new laser module, and three serial arrangements thereof, it is believed obvious that modifications and variations of my invention are possible in the light of the above teachings. Thus, the reflective inner surface of the housing may comprise a plurality of small flat mirrors in place of the continuous surfaces hereinabove described. Such arrangement provides controllable focusing of the lamps' radiation upon the end faces of the laser disk. One or both end faces of the laser disk may be optically pumped as desired. Also, cooling means for the lamps, controlled atmospheres, and selective filters separating the disk from the lamps may be employed singly or in combination. For continuous laser operation, cooling of both the disk and lamps (which may be of the arc type) is necessary. The laser beam divergence can be further controlled by interposing optical mode selectors between the laser modules. Also, an increasingly greater number of laser modules may be serially arranged in optical communication to increase the level of generated laser energy to a point just before damage to the laser disks may occur. Finally, our invention is not limited to neodymium as the laser material, but is intended to include other solid laser materials such as the well-known ruby for example. It is, therefore, to be understood that changes may be made in the particular embodiments of our invention described which are within the full intended scope of the invention as defined by the following claims.

What we claim as new and desire to secure by Letters Patent of the United States is:

1. In a laser device adapted for having the pumping of the laser material and resultant laser beam emission therefrom effected through an end surface of the laser material and comprising
    a housing having a reflective inner surface,
    a relatively short cylindrical body of material capable of excitation into a metastable high energy state and stimulated emission of electromagnetic radiation therefrom and having relatively large end surfaces, said body of material positioned within said housing, and
    means for optically pumping the body of material into the metastable high energy state solely through a first of said end surfaces thereof, and a resultant emission of a beam of electromagnetic radiation from the body of material is also effected through at least one of said end surfaces.

2. In the laser device set forth in claim 1 wherein said optical pumping means comprises
    means for optically pumping the body of material into the metastable high energy state through two end surfaces thereof.

3. In the laser device set forth in claim 2 wherein
    the large end surfaces of said body of material are parallel, and said optical pumping means comprises at least one lamp which when energized effects the pumping of the body of material into the metastable high energy state solely through said end surface thereof.

4. A laser device comprising
   a housing having a reflective inner surface,
   a relatively short cylindrical body of material capable of excitation into a metastable high energy state and stimulated emission of electromagnetic radiation therefrom and having relatively large end surfaces, said body of material positioned within said housing,
   means for determining an optical resonant cavity including said body of material and having a partially transmissive end, and
   means for optically pumping the body of material into the metastable high energy state through at least one end surface thereof whereby a beam of electromagnetic radiation is generated and emitted from said body of material through said end surfaces thereof upon said material being optically pumped, and the beam is emitted from said optical resonant cavity means through said partially transmissive end thereof.

5. The laser device set forth in claim 4 wherein
said optical pumping means comprises a plurality of lamps positioned within said housing and the beam of electromagnetic radiation is generated and emitted from said body of material upon energization of said lamps which effects the pumping of the material into the metastable high energy state solely through said end surfaces thereof.

References Cited
UNITED STATES PATENTS

| | | | |
|---|---|---|---|
| 3,140,451 | 7/1964 | Fox | 331—94.5 |
| 3,210,688 | 10/1965 | Simpson | 331—94.5 |
| 3,241,085 | 3/1966 | Marcatili | 331—94.5 |

JEWELL H. PEDERSEN, *Primary Examiner.*

W. L. SIKES, *Assistant Examiner.*

U.S. Cl. X.R.

330—4.3